Jan. 12, 1954    M. ROMAN    2,665,599
POWER-DRIVEN TOOL
Filed June 27, 1952
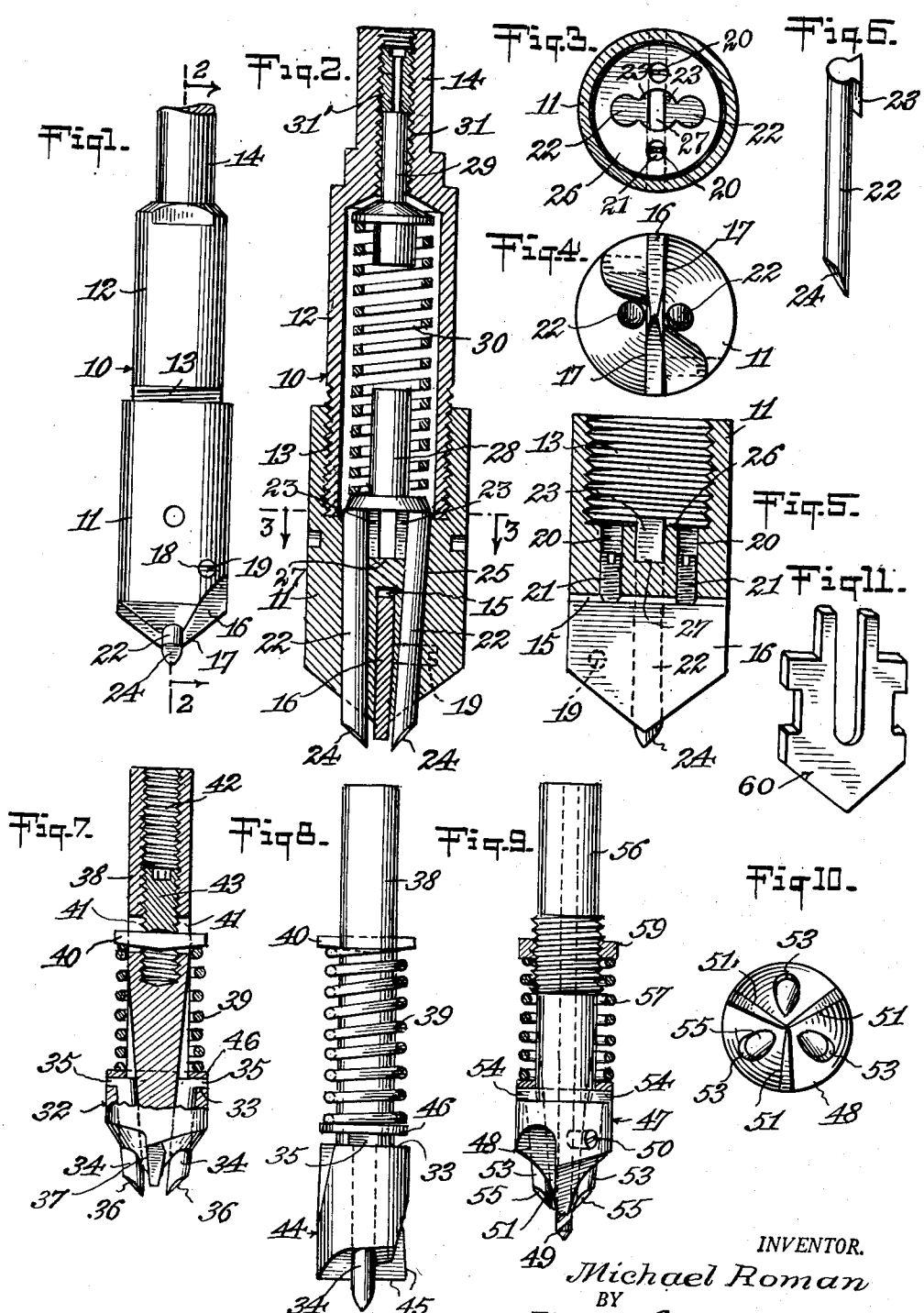
INVENTOR.
Michael Roman
BY
Munn, Liddy & Nathanson
Attorneys Patented Jan. 12, 1954

2,665,599

UNITED STATES PATENT OFFICE 2,665,599

POWER-DRIVEN TOOL

Michael Roman, New York, N. Y.

Application June 27, 1952, Serial No. 295,855

4 Claims. (Cl. 77—73.5)

This invention relates to power driven tools having spring activated pilots.

The principal object of the present invention is the provision of a tool of the indicated character having among others the following advantages and benefits. The tool can be driven at relatively high speeds in carrying out countersinking operations on metal work. It will produce a clear cut countersink without spoiling the work.

At high speed the tool will operate on soft metals without "hogging" and "chattering," thereby producing a true and even cut and smooth finish of the work.

The tool produces an even cut in all directions due to the self-guiding principle involved in its operation.

The work itself does not have to be clamped down to a work table, because the tool not only functions as a centering device, but also serves to hold the work in place during a material removing or cutting operation.

The tool includes pilots or guides which are extensible by virtue of which greater accuracy is attained in making cuts of various depths.

The tension on the aforesaid pilots is adjustable to allow for the different characteristics of different kinds of metal being cut and respecting the depth of the cut to be made, wherein a corresponding greater tension is provided to meet the requirement of comparatively deep cuts.

The tool is designed and adapted for use with various cutting edges and two or more pilots for cutting at any angle.

With the foregoing, other objects and advantages of the invention will appear when the following specification is read in conjunction with the accompanying drawing, in which:

Fig. 1 is a side elevational view of a tool constructed in accordance with the present invention.

Fig. 2 is an enlarged central longitudinal sectional view taken on the line 2—2 of Fig. 1.

Fig. 3 is a transverse sectional view taken on the line 3—3 of Fig. 2.

Fig. 4 is a view of the cutting end of the tool.

Fig. 5 is a central longitudinal sectional of the lower section of the tool, the view being at a right angle to that in Fig. 2.

Fig. 6 is a perspective view of one of the pilots or guides.

Fig. 7 is a side view of a tool modified in accordance with the present invention, parts of the tool being shown in section.

Fig. 8 is a side view of a tool embodying further modification in accordance with the invention, parts thereof being shown in section.

Fig. 9 is a side view of a tool embodying still further modifications in accordance with the invention, parts thereof being shown in section.

Fig. 10 is a view of the cutting end of the tool shown in Fig. 9, omitting the center bit and showing three pilots.

Fig. 11 shows a modified form of pilot or guide.

In Figures 1 and 2 there are shown features of a complete power driven tool for producing a countersink in a predrilled piece of work. The tool includes a barrel or housing 10 comprising a lower section 11 and an upper section 12. These sections are connected in coaxial alinement by complementary screw threads 13 which also enable the sections to be detached one from the other. The section 12 has a shank 14 which is receivable in a suitable chuck for imparting rotary motion to the tool.

The lower end of the section 11 is conical and has a central transverse kerf 15 which is occupied by a blade 16 having downwardly converging cutting edges 17 which produce a conical countersink in the operation of the tool. Tapped holes 18 in section 11 at opposite sides of the blade 16 receive set screws 19 which are screwed home against the blade. The section 11 also has tapped holes 20 therein at opposite sides of the axis of rotation and paralleling the axis. The holes 20 communicate with the kerf 15 and receive adjusting screws 21, respectively, which abut the upper end of the blade 16. The screws 19 and 20 serve to secure the blade 16 in the desired operative position of adjustment.

In order to center and guide the tool, there is provided a pair of similar pilots or guides 22. One such pilot is shown most clearly in Fig. 6. Each pilot 22 may be made of any suitable metal in the form of a short rod which is round in cross section with a lateral dovetail projection 23 on the upper end. The lower end of each pilot is cut at an oblique angle and is transversely rounded, as 24. The oblique surface 24 of one pilot is the exact reverse of the surface 24 of the other pilot. In other words there are left and right surfaces 24 which have a downwardly convergent relation with respect to each other to contact the work laid on a table of a machine in which the tool is used.

The housing section 11 has a recess 25 which conforms to the shape of each pilot 22. The recess is of an inverted generally U shape formation extending through the lower conical surface of the section 11, and also through a shoulder 26 formed interiorly of the section 11. The recess 25 also provides a shoulder 27 below the shoulder 26. The pilots 22 are disposed diametrically opposite each other in a slightly downward convergent relation to each other but may be disposed parallel to the axis of rotation. The projections 23 enable the pilots to have up and down movement while preventing them from turning with respect to the section 11. The projections 23 also cooperate with the shoulder 27 to limit the downward movement of the pilots.

The pilots 22 are spring loaded or activated in order to yieldingly retain them under constant pressure. For this purpose there are provided tappets or plungers 28 and 29 and a helical compression spring 30 which is interposed between the tappets 28 and 29. The parts 28, 29 and 30 are arranged within the housing section 12. The shank 14 has a central longitudinal threaded bore 31. The tappet 29 projects upwardly into the bore 31. An adjusting screw 31' in the bore 31 cooperates with the tappet 29 for the purpose of varying the tension exerted by the spring 30. The tappet 28 bears on the upper ends of the pilots 22. The spring 30 through the intervention of the tappet 28 holds the pilots 22 fully extended with the tappet 28 in contact with the shoulder 26.

When the above described tool is in operation, the pilots contact the work, and as the blade 16 cuts into the work, the pilots yield upwardly while exerting constant pressure on the work, keeping the tool centered as the rotary cutting operation progresses and until the countersink of the required depth is completed.

In Fig. 7 there is shown a modified form of drill or bit 32 for making a conical countersink. The drill 32 has a circular shoulder 33. Pilots or guides 34 are carried by the drill, and are arranged in a downwardly convergent relation diametrically opposite each other for up and down movement in bores provided for the pilots. Each pilot 34 has a head 35 on its upper end and its lower end has an oblique and transversely rounded work contacting surface 36 whose angularity is similar to that of the cutting edges 37 of the drill. The heads 35 cooperate with the shoulder 33 to limit the downward movement of the pilots, and said heads also cooperate with "flats" on the shank 38 to prevent the pilots from turning with respect to the drill.

The pilots 34 are spring loaded or activated by a helical compression spring 39 which surrounds the shank 38 between the heads 35 of the pilots and a plunger 40 operable in longitudinal slots 41 in the hollow internally threaded portion of the shank 38. The threads are designated 42, and a tension adjusting screw 43 cooperates therewith. It is obvious that the screw 43 may be turned with a suitable tool to increase or decrease the tension of the spring 39 on the pilots 34 to meet the requirements of comparatively deep and shallow cuts.

The drill 44 shown in Fig. 8 is substantially similar to the drill shown in Fig. 7, and similar reference numerals will be given to corresponding parts. The drill 44 differs from the drill 32 in that the cutting edges 45 of the drill 44 are right angular in order to produce a circular flat bottom countersink. Also a washer 46 is interposed between the heads 35 of the pilots and the spring 39.

In Figs. 9 and 10 there is shown in accordance with the present invention a further modified form of cutting tool 47. This tool comprising a large drill or bit 48 and a small center drill or bit 49 mounted in the drill 48 and adjustably and removably held therein by a set screw 50 carried by the drill 48. The drill 48 has three diverging cutting edges 51 for producing a conical countersink, and the drill 49 of the twist type produces a center hole in the work for the countersink. The drill 48 provides a circular shoulder 52. Pilots or guides 53 are carried by the drill 48, there being three similar pilots 53. Each of the pilots 53 is round in cross section and has a head 54 on the upper end and the lower end has an oblique and transversely rounded work contacting surface 55. The pilots 53 are arranged in a downwardly convergent relation with respect to each other for up and down movement relatively to the drill 48 which has bores to receive the pilots disposed in the stated manner. The heads 54 cooperate with the shoulder 52 to limit the downward movement of the pilots, and said heads 54 also cooperate with "flats" on the shank 56 of the tool to prevent the pilots from turning with respect to the drill 48. The pilots are activated by a helical compression spring 57 which surrounds the shank 56 between a washer 58 on the shank in contact with the heads 54 and a tension adjusting nut 59 in threaded engagement with the shank. If desired a single pilot or guide 60 as shown in Fig. 11 may be used in lieu of a plurality of pilots or guides.

It will be understood that the cutting blade 16 of the tool shown in Figs. 1 and 2 may be readily replaced by other tools for making cuts of various shapes and sizes; that all parts of the tool are replaceable; and that the tools shown are of substantial and efficient design for carrying out the aforesaid objects of the invention.

It is to be understood that the invention is not restricted to the details above described, but includes all constructions and modifications coming within the scope of the appended claims.

I claim:

1. A rotary cutting tool comprising a rotatable housing comprising a lower section and an upper section detachably connected with the lower section, said lower section having a central transverse kerf opening through the bottom surface thereof, a cutting blade extending into said kerf, means carried by said lower housing section which secure said blade in the desired cutting position, pilots disposed in a recess in the lower housing section for up and down movement with respect thereto, the lower ends of the pilots projecting exteriorly of said bottom surface, upper and lower tappets arranged for axial movement in the upper housing section, the lower tappet contacting the upper ends of said pilots, a helical compression spring arranged within the upper housing section and interposed between said tappets, cooperative means on the pilots and lower housing section limiting the downward movement of the pilots, and adjustable means on the upper housing section which bears on the upper tappet for the purpose of varying the tension of the spring.

2. A rotary cutting tool comprising a rotatable housing comprising a lower section and an upper section detachably connected with the lower section, said lower housing section being provided with cutting edges shaped to produce the desired contour, pilots carried by said lower housing section for up and down movement with respect thereto, the lower ends of the pilots projecting below said cutting edges in the normal position of the pilots, upper and lower tappets arranged for axial movement in the upper housing section, the lower tappet contacting the upper ends of said pilots, a helical compression spring arranged within the upper housing section and interposed between said tappets, cooperative means on the pilots and lower housing section limiting the downward movement of the pilots into their normal position, and adjustable means on the upper housing section which bears on the upper tappet for the purpose of varying the tension of the spring.

3. A rotary cutting tool as set forth in claim 2, wherein said adjustable means consists of a screw in threaded engagement with the threads of a bore extending coaxially in said upper housing section.

4. A rotary cutting tool comprising a rotatable housing comprising a lower section and an upper section detachably connected with the lower section, said lower section having a central transverse kerf opening through the bottom surface thereof, a cutting blade extending into said kerf, said blade having cutting edges on its lower end, means carried by said lower housing section which secure said blade in the desired cutting position, pilots carried by said lower housing section for up and down movement with respect thereto, the lower ends of the pilots projecting below said cutting edges in the normal position of said pilots, means carried by the upper housing section which yieldingly exerts a downward pressure on said pilots, and cooperative means on the pilots and lower housing section limiting the downward movement of the pilots into their normal position.

MICHAEL ROMAN.

References Cited in the file of this patent

UNITED STATES PATENTS

| Number | Name | Date |
|---|---|---|
| 2,613,558 | Swenson | Oct. 14, 1952 |